CIRCUIT FOR RENDERING GAIN CONTROL OUTPUT INDEPENDENT OF VOLTAGE VARIATIONS ON AMPLIFIER CONTROL ELECTRODE
Filed Sept. 14, 1954
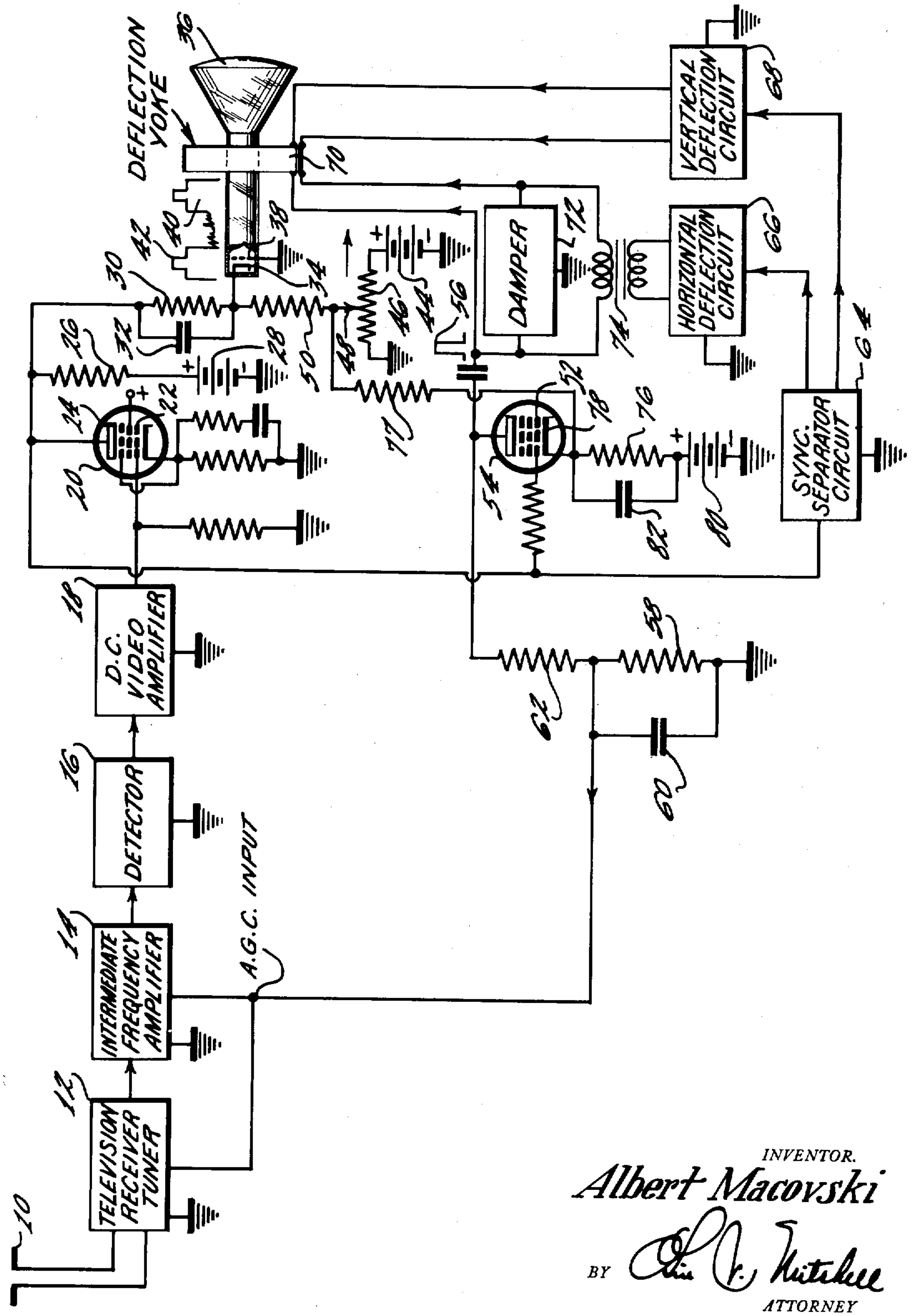
INVENTOR.
Albert Macovski
BY [signature]
ATTORNEY

United States Patent Office 2,757,235
Patented July 31, 1956

2,757,235

CIRCUIT FOR RENDERING GAIN CONTROL OUTPUT INDEPENDENT OF VOLTAGE VARIATIONS ON AMPLIFIER CONTROL ELECTRODE

Albert Macovski, Massapequa, N. Y., assignor to Radio Corporation of America, a corporation of Delaware

Application September 14, 1954, Serial No. 455,953

5 Claims. (Cl. 178—7.5)

The present invention relates to improvements in television receiving systems, and more particularly to means for improving the useful dynamic range of input signals over which a television receiver may successfully reproduce television images.

More directly the present invention relates to improvements in means for maintaining a synchronized relation between television receiver deflection circuit operation and received synchronizing pulses over a wide range of received signal intensities.

In television receiver design, it has been common place to maintain a direct current coupling from the video detector to the kinescope picture reproducing tube of the receiver. Those direct current changes in the signal which represent scene brightness change are by this means faithfully reproduced by the kinescope. In color television receivers, for example, it is desirable that direct current picture information be presented to the kinescope in order to realize a desirable degree of color fidelity. In the interests of economy, it has further been the practice to connect the input of the automatic gain control circuit for the receiver at the output of the last video amplifier. In this way, advantage can be taken of the amplification of the entire video amplifier so as to reduce the additional amplification, if any, required within the automatic gain control circuit per se.

One of the most convenient ways of taking advantage of the high level video signal developed by the video amplifier is to directly connect the input of the automatic gain control circuit to a take-off point in the load circuit of the last video amplifier. This load circuit is additionally direct current coupled to the kinescope picture reproducing means. If then a brightness control means is provided for the kinescope, it may well vary the D. C. potential of the take-off point in the load circuit of the video amplifier as a function of brightness control setting. It will be clear that under such a circuit arrangement the bias applied to the automatic gain control circuit will also be modified. Under certain conditions, this can become troublesome. For example, if the polarity of the video signal applied to the kinescope is sync positive (the synchronizing signal waveform extending in a positive direction) and the take-off point in load circuit of the video amplifier is connected to the grid circuit of a pulsed automatic gain control tube, a change in the brightness of the kinescope may result in grid current conduction in the AGC tube with the consequent loading down of the video amplifier and "crushing" of the synchronizing signal. The "crushing" or distortion of the synchronizing signal waveform is generally attended by missynchronization of the television deflection circuits. Such problems are particularly severe in cases where the television receiver is subject to large variations in the average value of received signal. This will, of course, produce a change in the average direct current potential of the video amplifier load circuit with the possibility of producing a sufficient net change in the bias of the AGC tube to produce grid current crushing of sync.

It is therefore an object of the present invention to provide an improved television receiving circuit in which the range of received signal amplitudes over which the receiver will successfully operate is enlarged.

It is further an object of the present invention to provide an improved video amplifier, synchronizing signal separating circuit, automatic gain control circuit, and kinescope brightness control circuit, in which changes in the kinescope brightness will not deleteriously affect the operation of the deflection circuits.

It is further an object of the present invention to provide a D. C. coupled video output amplifier for direct current connection to a kinescope with means for preventing variations in the D. C. potential level of the kinescope load circuit from deleteriously affecting the operation of a D. C. coupled automatic gain control circuit and associated beam deflection circuits.

In the realization of the above objects and features of advantage, the present invention, in one of its more specific forms, provides brightness control means for a kinescope which automatically varies the bias on an associated automatic gain control tube so that the automatic gain control tube may be direct current coupled to the video amplifier at a point whose potential is affected by brightness control changes to correct for the influence of such potential change.

A more complete understanding of the present invention can be obtained by reference to the following specification taken in combination with the accompanying drawing which illustrates by a combination block and schematic representation a television receiving system embodying one form of the present invention.

Turning now to the drawing there is indicated at 10 a television receiving antenna conventionally coupled to a television receiver tuner 12. Signals developed at the output of the tuner 12 are applied to an intermediate amplifier 14 whose output is in turn coupled to a detector or video demodulator circuit 16. A direct current video amplifier 18 is shown to be direct current coupled to the detector 16 for driving of the output video amplifier tube 20. By well known means the direct current component from the video amplifier 18 is preserved in the application of the video signal to the control grid 22 of tube 20.

The anode 24 of the output video amplifier tube 20 is connected through a load resistor 26 to a source of anode supply potential 28. The video signal developed at the upper terminal of the resistor 26 is coupled by a resistor 30 and capacitor 32 to the cathode 34 of the kinescope 36. The control electrode 38 of the kinescope 36 is connected with ground potential. In order for conventional operation of the kinescope 36 to obtain, the video signal 40 applied to the cathode 34 must be of a polarity in which the synchronizing signals 42 are extended in a positive going direction.

Conventional brightness control means for the kinescope 36 are provided through the agency of a potential source 44 having a potentiometer 46 connected in shunt therewith. The arm 48 on the potentiometer 46 is connected through resistor 50 to the cathode 34 of kinescope 36. Since the potential source 44 is connected through circuit ground to the kinescope control electrode 38, and the potential source 28 is likewise connected with circuit ground, moving the arm 48 on the potentiometer 46 will cause the net bias between the cathode 34 and control grid 38 of the kinescope 36 to change thereby controlling the brightness of the reproduced television image. The potentiometer 46 taken in combination with resistors 50, 30 and 26 in effect comprises a voltage divider system and this voltage divider system forms a part of the load circuit of tube 20.

An automatic gain control system is also provided for the television receiving circuit shown in the drawing.

Automatic gain control action is obtained by applying the demodulated video signal 40 to the control electrode 52 of AGC tube 54. AGC tube 54 is shown connected as a conventional type of pulsed automatic gain control amplifier in which flyback pulses 56 from the horizontal deflection circuit are rectified by the anode cathode conductance of the tube 54 to develop a negative AGC potential across the anode load resistor 58. Capacitor 60 is connected in shunt with the resistor 58 to obtain a suitable time constant in the automatic gain control action. Resistor 62 also forms a portion of the load circuit for the tube 54. The value of AGC potential is dependent upon the amplitude of the synchronizing wave form 42 during the flyback interval of the deflection circuit. Video signal is also derived from the anode of the video amplifier 20 for application to the sync separator circuit 64. Separated sync is applied to the horizontal and vertical deflection circuits 66 and 68 which in turn drive the electromagnetic deflection yoke 70 in a conventional manner. Damping means 72 is shown as connected in a conventional way across the secondary winding of the horizontal transformer 74.

In accordance with the present invention a cathode load resistor 76 is connected between the cathode 78 of tube 54 and a source of positive potential 80. Capacitor 82 is placed in shunt with the cathode resistor 76 to reduce degeneration. A resistor 77 is then connected from the cathode 78 to the arm 48 of the potentiometer 46.

In the operation of the television system shown in the drawing, it will be clear that if the arm 48 of the potentiometer 46 is moved in the direction of arrow 84 to decrease the brightness of the reproduced television image, the positive potential of the cathode 34 will thereby be increased. Inasmuch as the control grid 52 of the AGC tube 54 is direct current coupled to the anode of tube 20, it follows that the potential of this control grid will also swing in a positive direction as brightness is decreased. In prior art systems such a swing in the grid potential of tube 54 would cause a net bias change on the AGC tube in a direction tending to cause the tube 54 to conduct on synchronizing signal peaks.

Should, for example, the amplitude of the received signal increase or the brightness component of the received signal increase sufficiently as the brightness control is moved to decrease image brightness, the grid current conduction which will result during the synchronizing pulse intervals in tube 54, will tend to crush the synchronizing signal waveform. This crushing effect is due to the action the grid current in tube 54 acting through the finite impedance of the video signal source as viewed at the anode of tube 20. This crushing or limiting action will not only tend to produce an error in AGC circuit operation, but will also distort the synchronizing signal waveforms applied to the horizontal and vertical deflection circuits. This may well result in missynchronization of the television deflection circuits.

In accordance with the present invention, however, this deleterious crushing action found in prior art circuits is readily overcome by connecting the anode 78 of the AGC tube 54 to a potential which varies in accordance with the bias changes on the kinescope 36 resulting from brightness control manipulation. It is therefore convenient, in accordance with the present invention to direct current coupled the arm 48 of the potentiometer 46 to the cathode 78 of tube 54 through a resistor 77. When the values of resistors 30, 50, 77, and 76 are properly determined there will be no net bias change on the AGC tube 54 as a function of brightness control operation. This result may be optimized by selecting the values of the resistors in the load circuit of tube 20 so as to bear the following relation to the resistors 77 and 76 connected with the cathode of the AGC tube 54. For convenience in setting forth the optimum relation between the values of the resistors concerned in the operation of the present invention, the resistors will be designated by the capital letter R followed by their corresponding index number shown in the drawing.

The optimum relation is:

$$\frac{R26}{R30}+R50=\frac{R76}{R77}$$

When the above mathematical expression is satisfied the bias on the AGC tube 54 will be substantially independent of the brightness control adjustment. If then, the bias on the AGC tube 54 is initially adjusted by choosing an appropriate value of potential at 80, synchronizing signal peaks will never cause the grid 52 to swing sufficiently positive to produce grid current. In this way, both AGC and deflection circuit operation will be unaffected by brightness control adjustment.

Although the present invention has been illustrated by its embodiment in one form of television receiving system, it will be understood that its utility is in no way limited to the arrangement shown in the drawing. For example, it is well within the scope of one skilled in the art to establish the direct current component in a television signal by a direct current restorer circuit rather than provide D. C. coupling from the detector to the video amplifier. On the other hand, the advantages of the present invention are not limited to the case where a direct current component is in fact preserved in the output circuit of the video amplifier. It may be desirable as in some forms of television receiving circuits to eliminate the D. C. picture component of the television signal. The advantages of the present invention, even under these conditions are obvious since changes in the amplitude of the received signal for any reason whatever will not cause grid current conduction in the AGC tube. Moreover, the advantages of the present invention are in no way limited to monochrome television receivers but may be fully realized in the application of the invention to the luminance channel of color television receivers.

Having thus described my invention, what is claimed is:

1. In a television receiver having a plurality of elements, the combination of: a source of demodulated television signal having a direct current component; a video amplifier means direct current coupled in driven relation to said signal source, said amplifier means having an output circuit means developing an output signal having a direct current component; a cathode ray beam kinescope means direct current coupled with said output circuit means so as to produce an image in said kinescope in response to video signal delivered by said video amplifier output circuit means; manually controllable brightness control means operatively connected with said kinescope means in a manner imposing a controllable direct current bias potential on said kinescope, which bias potential is communicated through said direct current kinescope coupling means to said amplifier output circuit means to produce undesired direct current potential changes in said amplifier output circuit means in response to manually controlled brightness changes in said kinescope; an automatic gain control circuit operatively interconnected to elements of said receiver and direct current coupled to said output circuit means so as to be desirably responsive to video signals delivered by said output circuit means, said gain control circuit being undesirably responsive to said undesired direct current potential changes in said output circuit means attributable to said manually controlled brightness changes; means direct current coupled with said brightness control means developing a correcting potential, such that the value of said correcting potential is a direct function of the value of brightness control bias applied to said kinescope; and means direct current coupling said correcting potential developing means to said automatic gain control circuit in a manner tending to offset and correct for the response said undesired direct current potential changes in said output circuit means produces in the operation of said automatic gain control circuit.

2. In a television receiver having a plurality of elements, the combination of: a source of demodulated television signal having a direct current component; a video amplifier means direct current coupled in drive relation to said signal source, said amplifier means having an output circuit means developing an output signal having a direct current component; a cathode ray beam kinescope means direct current coupled with said output circuit means so as to produce an image in said kinescope in response to video signal delivered by said video amplifier output circuit means; manually controllable brightness control means operatively connected with said kinescope means in a manner imposing a controllable direct current bias potential on said kinescope, which bias potential is communicated through said direct current kinescope coupling means to said amplifier output circuit means to produce undesired direct current potential changes in said amplifier output circuit means in response to manually controlled brightness changes in said kinescope; an automatic gain control circuit operatively interconnected with other elements of said receiver having a first and second independent input terminals, said gain control circuit being responsive to direct current potential changes at either of said input terminals to produce a change in developed automatic gain control potential for said receiver; direct current coupling means operatively connecting said first input terminal to said amplifier output circuit means to operatively apply video signals to said automatic gain control circuit, said automatic gain control circuit being thereby undesirably responsive to said undesired direct current potential voltage changes in said output circuit means attributed to manual brightness changes in said kinescope means; means direct current coupled with said brightness control means developing a correcting potential, the value of which is a direct function of the value of brightness control bias applied to said kinescope; and means direct current coupling said correcting potential developing means to said automatic gain control circuit second input terminal with such electrical polarity and magnitude as to influence said automatic gain control circuit in a manner opposite to the influence imposed thereon by said undesired potential changes appearing in said amplifier output circuit means in response to manually produced brightness changes in the image reproduced by said kinescope.

3. In a television receiver, the combination of: an amplifier system including a tuner, intermediate frequency amplifier, detector, and video amplifier connected in operating relation to one another so as to deliver at the output of said video amplifier a video signal; a circuit potential reference means to which operating potentials and signals in said receiver are referenced; a vacuum tube operatively included in the output stage of said picture amplifier, said vacuum tube having at least an anode to which is operatively connected a relatively high impedance load circuit across which is developed a video signal; a cathode ray beam image reproducing tube having two control terminals, the potential between which determines the brightness of the image formed by the reproducing tube; direct current coupling means operatively connecting said control terminals across at least a portion of said load circuit to operatively apply video signals to said kinescope for defining a television picture; variable bias brightness control means direct current connected with said load circuit and said control terminals so as to desirably control the brightness bias between said image reproducing tube control terminals; an automatic gain control circuit operatively connected with said amplifier system, said gain control circuit having an input tube for accepting video signals, said input tube having a control grid and cathode; direct current coupling means operatively connecting said control grid to said load circuit in an operative relation thereto but undesirably responsive to voltage changes in said load circuit attributable to changes in brightness bias applied to said cathode ray tube; a cathode resistance means connected from said input tube cathode to said potential reference; and a direct current connection from said cathode to said brightness control means for imposing a potential on said cathode which varies as a function of brightness control bias and in a substantially complementary manner to said undesired bias voltage change so that the average direct current potential between said control grid and cathode is substantially unaffected by said variable bias brightness control means.

4. In a television receiver, the combination of: a television signal processing system including the elements of a tuner, intermediate frequency amplifier, detector, and video amplifier having an output stage, said elements being operatively interconnected with one another; a first vacuum tube in the output stage of said video amplifier, said vacuum tube having at least an anode and cathode; power supply means having a negative terminal and a plurality of relatively positive terminals; a first resistance means operatively connected from said anode to a first positive terminal for operatively polarizing said vacuum tube; a voltage divider resistance means having a manually adjustable, movable tap designated as a picture brightness control for said receiver as hereinafter defined; connections operatively placing said voltage divider resistance means across said power supply means; second resistance means operatively connected between said anode and said movable tap such that positioning of said tap provides an adjustment of the anode potential appearing at said tube; first direct current coupling means including a cathode load resistance for said first vacuum tube operatively connected by said cathode and said negative terminal, a cathode ray beam kinescope tube having at least a cathode and a control electrode; second direct current coupling means operatively connected between a point on said second resistance means and the cathode of said kinescope for applying signals delivered by said amplifier to said kinescope; third direct current coupling means connected between said kinescope control electrode and said negative terminal to establish said control electrode at substantially fixed potential relative to said negative terminal whereby adjustment of said movable tap adjusts the operating bias on said kinescope and hence the brightness of the reproduced television picture; a second vacuum tube having at least an anode, cathode and control electrode; fourth direct current coupling means operatively connected with said second vacuum tube and with other elements of said signal processing system for automatic gain control of said system in accordance with signals developed by said second tube; fifth direct current coupling means operatively connected between said second vacuum tube control electrode and said first vacuum tube anode to auply video signals with direct current component to said second tube for driving thereof, said first direct current coupling means further undesirably communicating to said second tube control electrode direct current potential changes in response to alterations in picture brightness through adjustment of the said movable tap, whereby the net control electrode-cathode bias on said second tube and hence the automatic gain control of said system tends to become a function of manually adjusted picture brightness; direct current coupling means operatively connected between the cathode of said second vacuum tube and said movable tap to alter the potential of said cathode, and hence the bias on said second tube, as a function of the position of said movable tap and with such electrical sense and magnitude as to maintain the net control electrode-cathode bias on said second tube substantially free of variations in response to changes in the position of said movable tap thereby reducing said aforesaid tendency of bias variation on said second tube; and third resistance means operatively coupling said second vacuum tube cathode with a second positive power supply terminal to form an operating circuit for said cathode such that said cathode displays a potential value which will maintain said second tube cathode in positive pilarity relation to said vacuum tube control electrode.

5. In a television receiving system the combination of: according to claim 4 wherein said first resistance means has an ohmic value R1, said second resistance means an ohmic value R2, said third resistance means an ohmic value R3, and said sixth direct current coupling means is a resistor of ohmic value R4 and said ohmic values are related as follows:

$$\frac{R1}{R2}=\frac{R3}{R4}$$

No references cited.